United States Patent
Sastry

(10) Patent No.: US 12,444,314 B2
(45) Date of Patent: Oct. 14, 2025

(54) GENERATIVE ARTIFICIAL INTELLIGENCE LEARNING METHOD AND SYSTEM FOR AN ON-LINE COURSE

(71) Applicant: Amesite Inc., Ann Arbor, MI (US)

(72) Inventor: Ann Marie Sastry, Ann Arbor, MI (US)

(73) Assignee: Amesite Inc., Detroit, MI (US)

( * ) Notice: Subject to any disclaimer, the term of this patent is extended or adjusted under 35 U.S.C. 154(b) by 120 days.

(21) Appl. No.: 18/176,303

(22) Filed: Feb. 28, 2023

(65) Prior Publication Data

US 2023/0215282 A1 Jul. 6, 2023

Related U.S. Application Data

(63) Continuation-in-part of application No. 17/016,072, filed on Sep. 9, 2020, now Pat. No. 11,620,916.

(60) Provisional application No. 62/897,863, filed on Sep. 9, 2019.

(51) Int. Cl.
*G09B 5/00* (2006.01)
*G06N 20/00* (2019.01)

(52) U.S. Cl.
CPC ............... *G09B 5/00* (2013.01); *G06N 20/00* (2019.01)

(58) Field of Classification Search
CPC ...................................... G06N 20/00
See application file for complete search history.

(56) References Cited

U.S. PATENT DOCUMENTS 8,602,793 B1 * 12/2013 Sniedzins ............... G09B 5/00
434/323
2016/0098936 A1 * 4/2016 Solomon ............ G09B 19/0046
434/276

* cited by examiner

*Primary Examiner* — Timothy A Musselman
(74) *Attorney, Agent, or Firm* — Richard T. Ogawa; Ogawa P.C.

(57) ABSTRACT

The invention provides a method and system for using a machine learning technique for identifying and outputting most relevant articles for a learning program.

16 Claims, 15 Drawing Sheets

- Each document, $\partial$, is comprised of a set of words.
- We have a collection of documents $D$. In $D$, there are $n$ unique words.
- For the vector space model, this means that each document can be represented as an element of an $n$-dimensional vector space, where the $i^{th}$ value of $\partial$ is the number of occurrences of the $i^{th}$ unique word in $D$.

Figure 7

- We use Non-Negative Matrix Factorization (NMF) to do feature extraction on the corpus.

- NMF works by creating a low-rank approximation of the corpus V resulting in two matrices W and H such that $V \approx WH$. The rank of W is significantly lower than that of D and we can think of its columns as being a basis of D.

- Each column vector of W is an approximation of the ideal set of words which comprise a document.

- We hand curate the list of words returned by the NMF and make a new document out of them

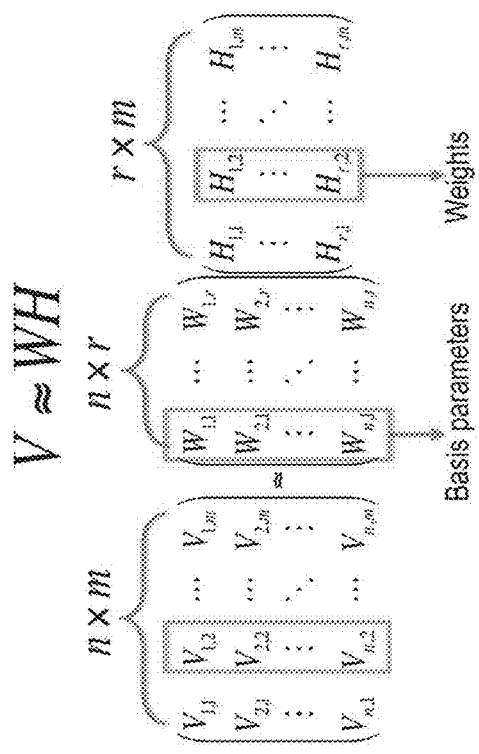

Figure 8

- Tf-idf is a numerical statistic that reflects how important a word is to a document amongst a corpus.
- We run Tf-idf over all documents so that now for each document vector $\partial$, the $i^{th}$ value of $\partial$ is the tf-idf score for the $i^{th}$ word in the document $$w_{i,j} = tf_{i,j} \times \log\left(\frac{N}{df_i}\right)$$

$tf_{i,j}$ = number of occurrences of $i$ in $j$
$df_i$ = number of documents containing $i$
$N$ = total number of documents

- Using the tf-idf scored vectors for each document, we calculate the cosine similarity between each document vector and the document composed of the words returned from the NMF feature extraction

- This ranks the articles and we then serve up the top 10 each week to the instructor for sharing

Questions:

Which of the following is NOT a key concept in computer science?

○ A) Algorithms

○ B) Data structures

○ C) Programming languages

○ D) Geometry

Submit

FIGURE 15

Ask a Question:

Virtual Instructor: Hello! Please ask any questions about the content.

Send

FIGURE 16

GENERATIVE ARTIFICIAL INTELLIGENCE LEARNING METHOD AND SYSTEM FOR AN ON-LINE COURSE

CROSS-REFERENCE TO RELATED PATENT APPLICATIONS

This application is a continuation in part of U.S. patent application Ser. No. 17/016,072 filed Sep. 9, 2020, which claims priority to U.S. Patent Application No. 62/897,863, filed on Sep. 9, 2019, commonly assigned and each of which is incorporated by reference herein for all purposes.

BACKGROUND OF INVENTION

The present invention relates generally to processing techniques for course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

"Education is the process of facilitating learning, or the acquisition of knowledge, skills, values, beliefs, and habits. Educational methods include storytelling, discussion, teaching, training, and directed research. Education frequently takes place under the guidance of educators, but learners may also educate themselves. Education can take place in formal or informal settings and any experience that has a formative effect on the way one thinks, feels, or acts may be considered educational. The methodology of teaching is called pedagogy. "https://en.wikipedia.org/wiki/Education.

Education originally occurred through a one by one basis between teacher and student or master and apprentice or partner and associate. Classrooms eventually took over to teach children in masses from pre-school to higher education. Most recently, education has been implemented on-line via the Internet to facilitate learning for students. Although education has progressed, it is desired that techniques to overcome difficulties in education, and more particularly learning are desired.

SUMMARY

According to the present invention, techniques related to course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

In an example, the present invention provides a system for real time knowledge of current events, e.g., periodicals, online feeds. In an example, the system has a network of computers interconnect to another to form a world wide network of computers. The system has a processing unit coupled to the network of computers using a communication bus. In an example, the system has an information storage system coupled to the network of computers and the processing unit. In an example, the information storage system comprises a plurality of documents, including press releases, text books, magazine articles, bulletins, web pages, white papers, and other informational documents. The system has a learning management system coupled to the network of computers. In an example, the learning management system comprises a program related to a topic for a course. In an example, the program comprises a plurality of pre-defined templates for the course, and a plurality of non-defined templates for the course. In an example, the system has a learning content robot coupled to the information storage system, the learning content robot comprising an artificial intelligence processing engine. In an example, the artificial intelligence processing engine comprises a natural language processing engine coupled to the information storage system. In an example, the natural language processing system is configured to search the information storage system using a key word or a pattern of key words for the topic, parse information derived from the search; process the parsed information using a neural network, having a plurality of weighing factors associated with the topic, select a document based upon the process of the parsed information; and transfer the selected document to the learning management system. In an example, the system has a configuration engine provided in the learning management system to populate the non-defined template with the selected document for the course to create a currently defined template using the selected document for the topic.

In an example, the present invention provides a method for using learning content robot coupled to an information storage system. The method includes processing a plurality of documents from an information management system using a learning content robot and using an artificial intelligence processing engine comprising a natural language processing engine coupled to the information storage system to search the information storage system using a key word or a pattern of key words for a selected topic. The method includes parsing information derived from the search, processing the parsed information using a neural network, having a plurality of weighing factors associated with the topic, selecting a document from the plurality of documents based upon the process of the parsed information, and transferring the selected document to a learning management system.

The system can be combined with other methods and systems such as those described in U.S. Ser. No. 16/252,409, filed Jan. 18, 2019; U.S. Ser. No. 16/254,316, filed Jan. 22, 2019; U.S. Ser. No. 16/268,282, filed Feb. 5, 2019; and U.S. Ser. No. 16/264,560, filed Jan. 31, 2019; each of which are incorporated by reference herein.

In an example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In various embodiments, the apparatus may include a mixed reality or virtual reality headset that captures the user data using sensors from within a headset (e.g. Microsoft HoloLens and Mixed Reality platform, Magic Leap platform, Google Daydream, etc.) or that captures user data from a headset using external sensors, (e.g. HTC Vive, Oculus Rift) Various embodiments of headsets may provide spatial orientation data including where the user is viewing within an image (e.g. a lecturer, white board, etc.), where they are gazing within an image (e.g. equation, graph or diagram, etc.), duration of time viewing materials (e.g. reading a slide, or .pdf, etc.); voice data (e.g. a user repeating a foreign language phrase); and the like.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

DESCRIPTION OF THE DRAWINGS

FIGS. 1 through 9 are simplified diagrams of a method and system for using robots and machine learning for facilitating an on-line course for a learning application according to an example.

Figure 13:
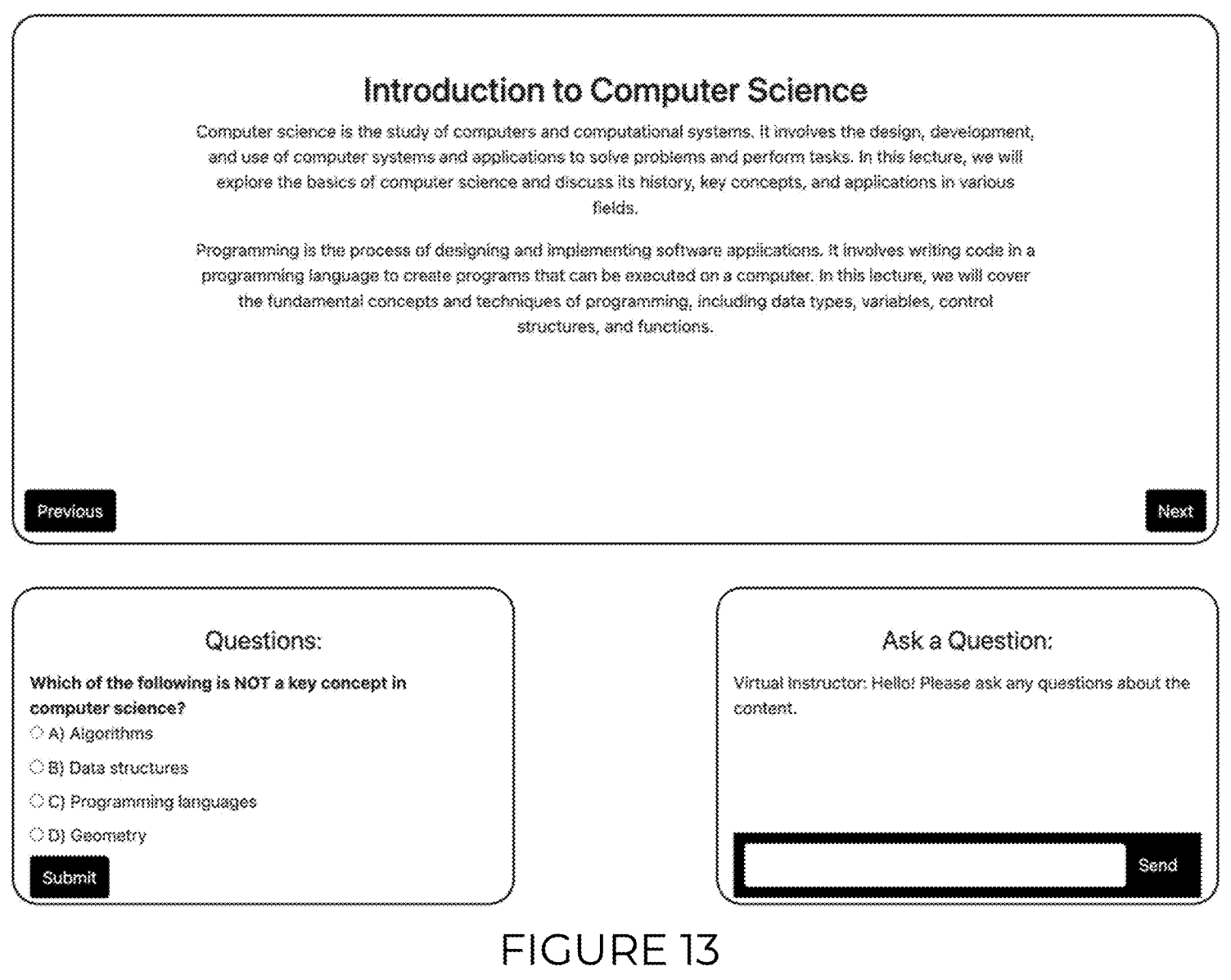
Figure 14:
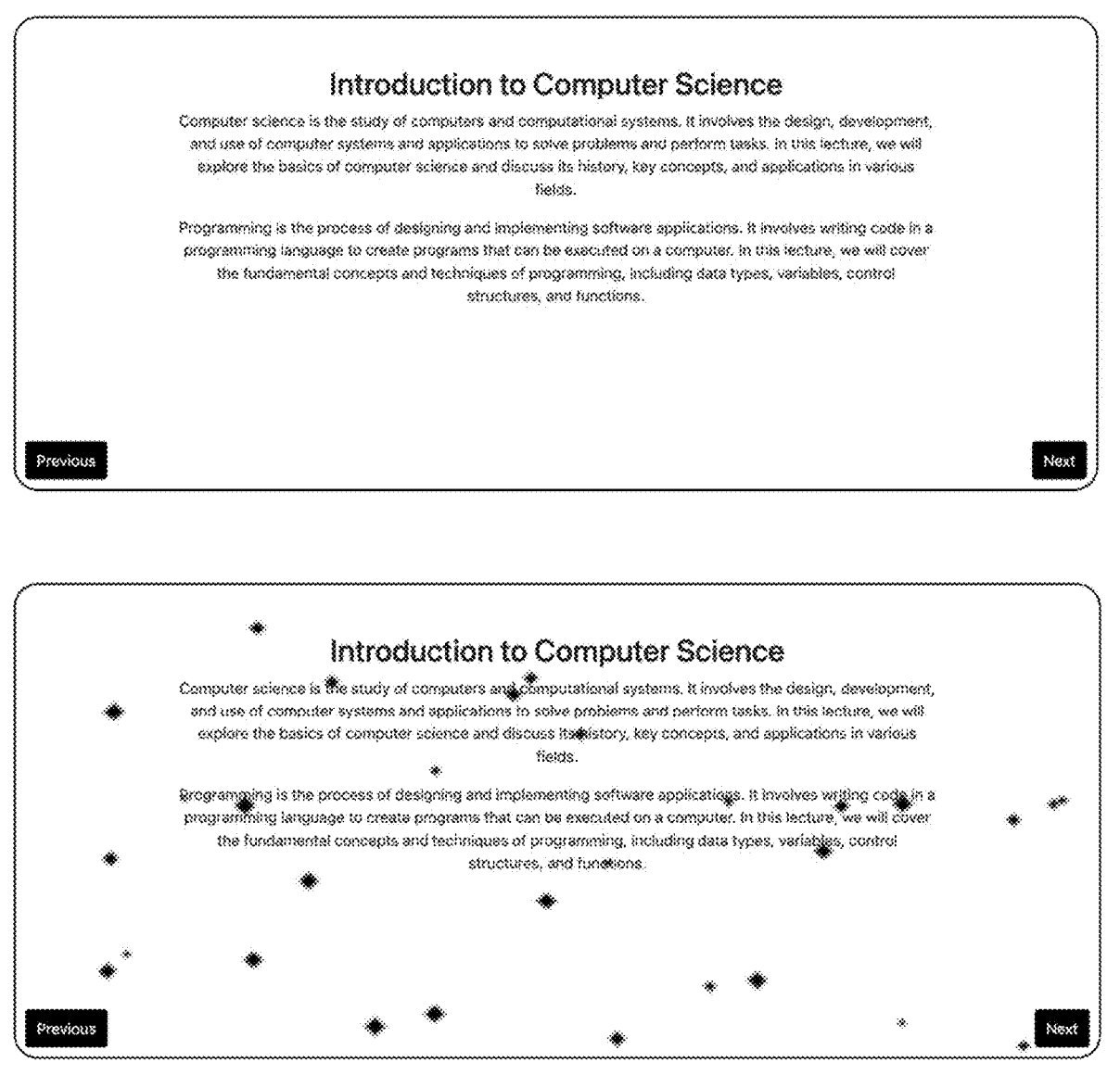

FIGS. 13-16 are simplified diagrams illustrating user interfaces according to an example of the present invention.

DETAILED DESCRIPTION OF THE SPECIFIC EXAMPLES

According to the present invention, techniques related to course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

In an example, in order to assist a reader of the present specification, the following definitions are provided.

"Product" means a program of learning, including access to the present computing platform; content prepared using the present robot or other entity for configuring a current publication with the product; teaching, curation, or learning assistance services for the Product.

"Partner" means an entity with a business relationship with the system that delivers the Product and shares branding with system.

"Learner" means a human agent who purchases and uses the Product.

"Offeror" means a Partner with or through the system delivers a Product. In an example, the Offeror provides certain services, including registration, billing, access to instructional staff, ongoing professional or educational accreditation, business experience and/or credentials, or other elements. In an example, the system may be the Offeror of some of its own Products.

"Instructional Staff" means human agents employed by Offeror. In an example, the system or one or more partners who provide teaching, curation, tutoring, discussion or coaching services to Learners using a Product.

"Learning Content Optimization Robot (LCOR)" means a robot device including one or more engines that couples to the information storage system, and learning management system. The LCOR can use artificial intelligence, machine learning, and natural language techniques.

Further details of the present examples can be found through out the present specification and more particularly below.

Figure 1:
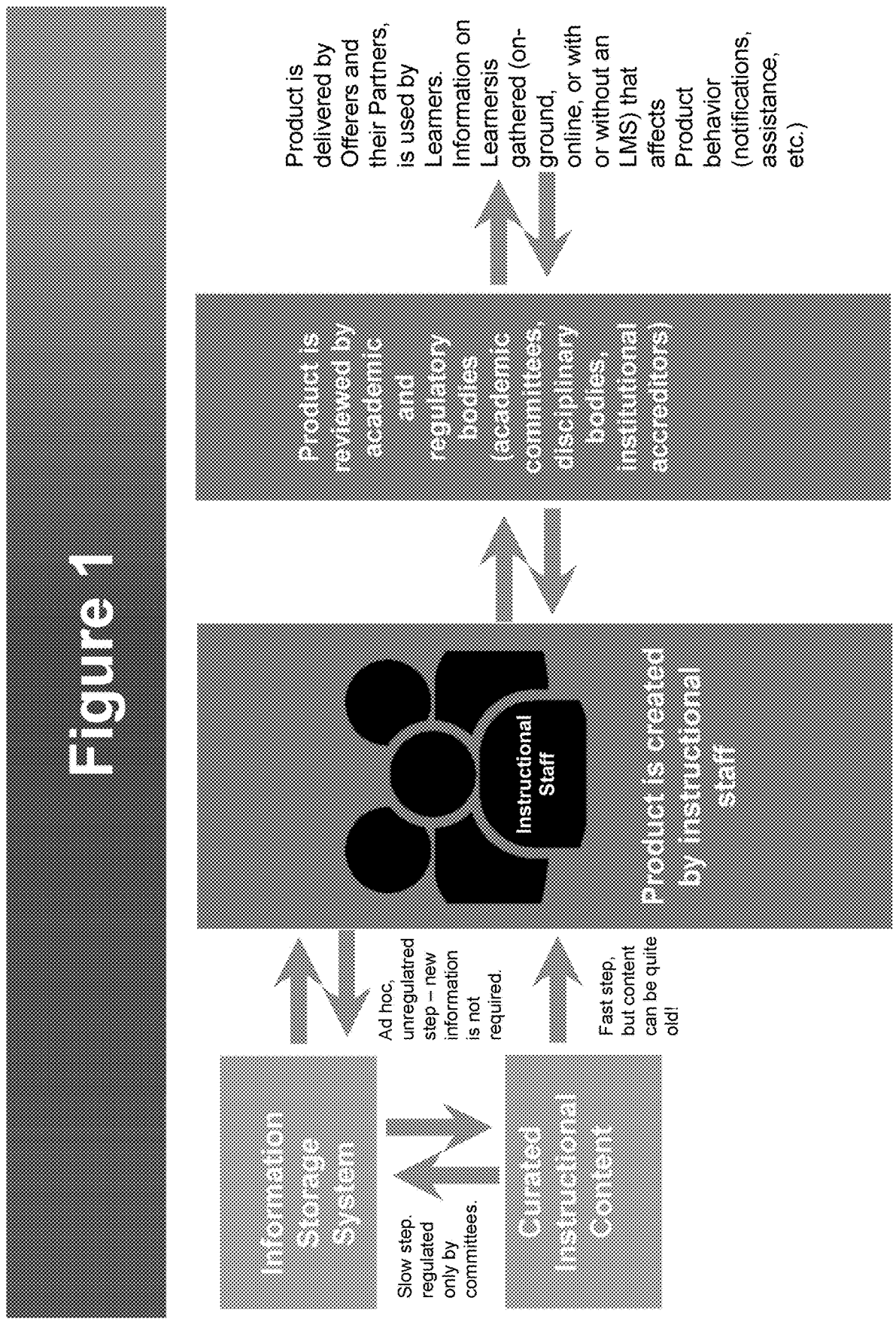

FIG. 1 is a simplified block diagram illustrating a process for learning using conventional learning systems. As shown, the convention process has an information storage system. The content is curated by an instructional staff. The content is often ad hoc, unregulated, and new information is not required. Once the content is created for a product for a course. The product is often reviewed by academic and regulatory bodies. The product is delivered by an offeror and their partners. In an example, learners use the product, and gives feedback from time to time. Further details of the present system and methods can be found throughout the present specification and more particularly below.

Figure 2:
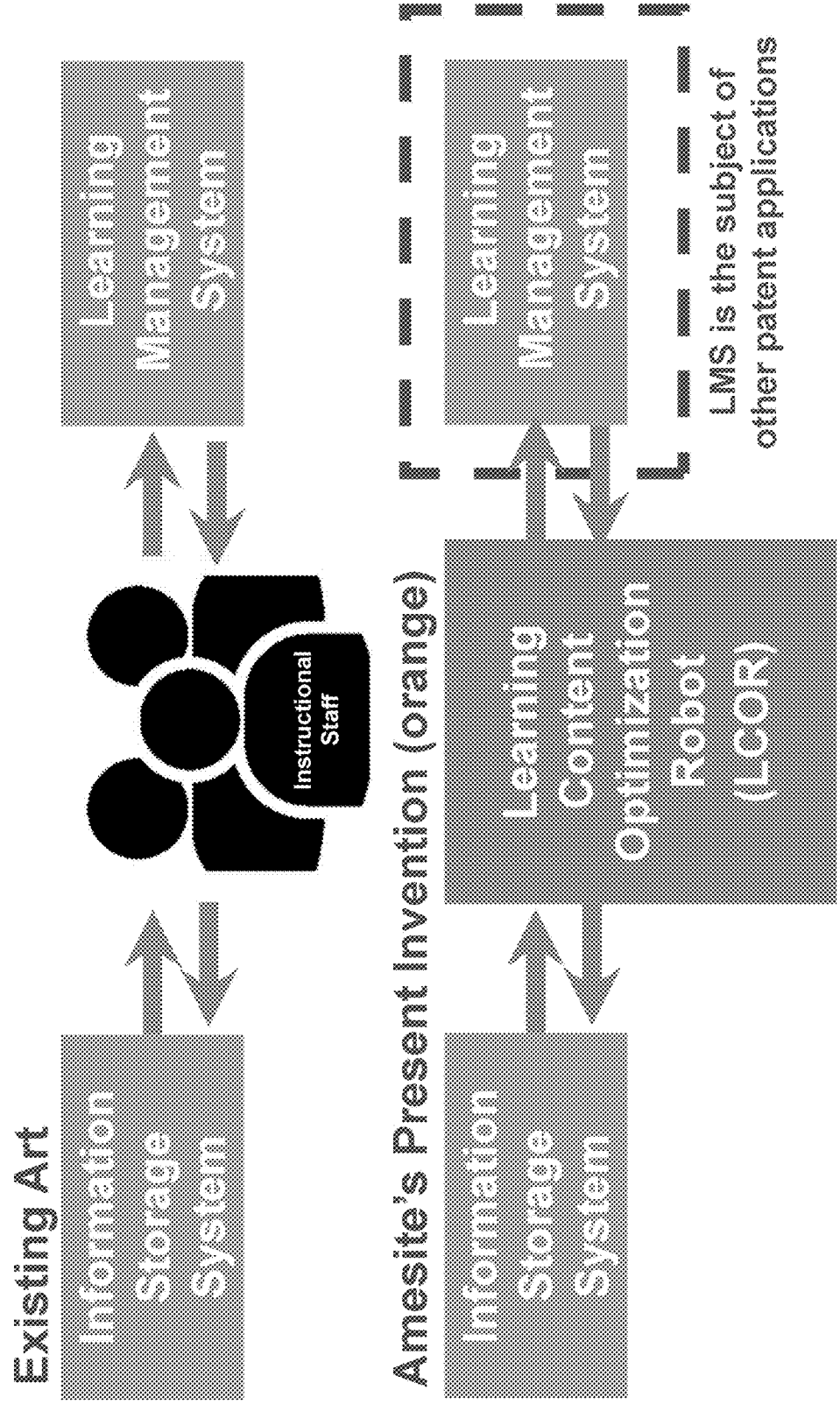

FIG. 2 is a simplified block diagram configured with a learning content robot according to an example of the present invention. In an example, the information management system is coupled to a learning content robot, which communicates to a learning management system.

Figure 3:
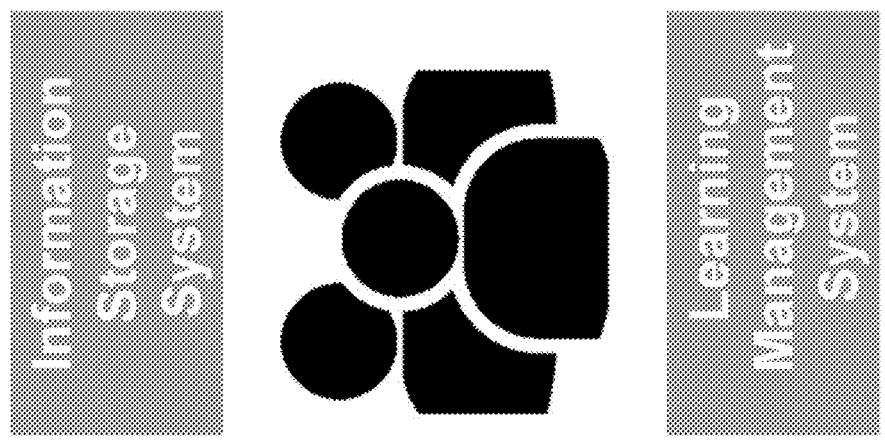

FIG. 3 is a simplified diagram of various elements in a process for learning according to an example. As shown, the process has various elements. In an example, an "Information Storage Systems" or ISS's is included. The ISS includes storage devices that have content holdings. In an example, the elements include publishers that sell databases of articles from popular, trade, scientific and other sectors as packages. In an example, the ISS are commonly described as third-party acquisition systems. Examples of the systems include, but are not limited to, EBSCO, ProQuest, OverDrive, Project Muse, and JSTOR. In an example, the systems also include certain University Presses, who increasingly are removing the "middleman" and marketing their IP directly (see: https://www.insidehighered.com/news/2018/10/18/university-presses-take-control-ebook-distribution). Of course, there can be other variations, modifications, and alternatives.

In an example, the elements include instructional staff. The instructional staff selects course content, and from time to time incorporate current events, as part of lectures, discussions or formal lecture notes. Such selection is often ad hoc, and entirely at the discretion of the instructional staff, so long as content and delivery methods are in conformance with agreed-upon standards by the following communities/entities:

a. academic committees within an institution, typically at the department and college or school level and are conducted by committees who advise an administrator (UM's process is typical and listed here: https://www.provost.umich.edu/programs/new_program_approval/approval_process.html);
b. regulatory or accrediting bodies that review curricula in certain disciplines, such as ABET, which accredits engineering programs (https://www.abet.org/); and
c. College or University-level accreditation, which is essential to nonprofits' ability to accept government support to students (e.g. Pell grants). Regional accreditation is more important in the US than "national" accreditation bodies (see: https://www.edsmartorg/regional-vs-national-accreditation/).

In an example, the system has learning management systems. In an example, the learning management systems are systems to store content and automate certain functions related to delivery of learning products. In an example, the systems include but are not limited to: storage of digital media, recording of certain user behaviors, issuance of notifications, calculation of grades, integration of certain operating functions (calculators, graphing tools, image processing tools, writing tools and editors and the like).

In an example, the learning management system comprises an artificial intelligence tools or engine to promote engagement and improved learner outcomes, and also reduce instructional time on administrative tasks, and also overall cost.

In an example, the present system has a learning content robot, which can be configured with any learning management system. Further details of the present system can be found throughout the present specification and more particularly below.

Figure 4:
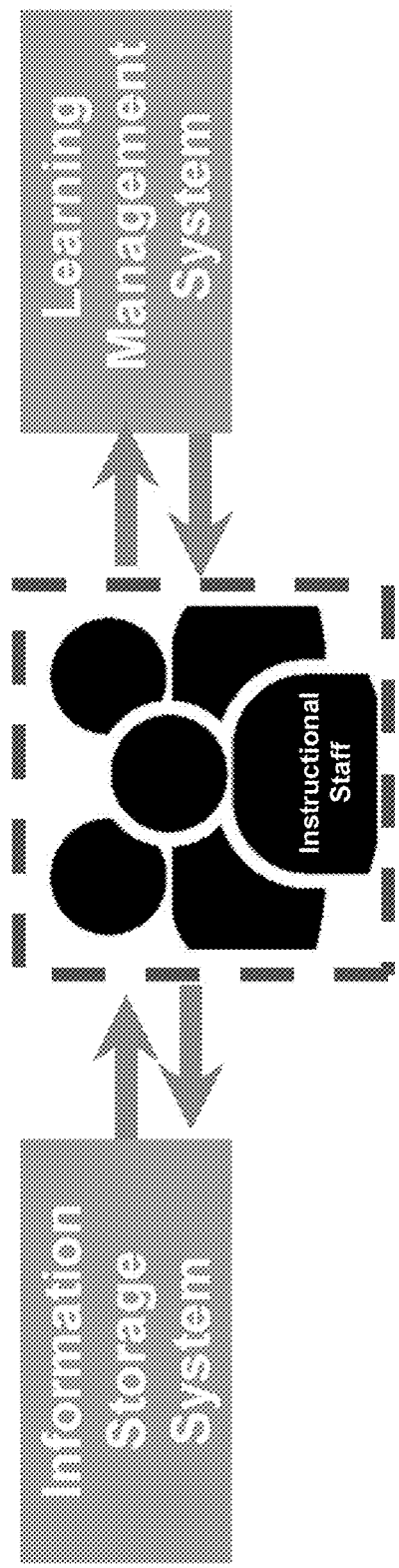

FIG. 4 is a simplified diagram of a conventional learning system and limitations of the conventional learning system. In an example, we discovered that there is no regulatory body has responsibility or interest in real-time integration of current events, new findings or other novel information, since all are focused on presently understood teaching norms, whose constructions predate modern search algorithms. Therefore, it is entirely ad hoc, and teaching products can be delivered with no integration of current knowledge. A present example—there is literally no requirement presently that biology teachers at any level in the U.S. immediately cease teaching that mitochondrial DNA are solely maternal, even though recent science has shown that it is both maternal and paternal (https://www.the-scientist.com/news-opinion/fathers-can-pass-mitochondrial-dna-to-children-65165).

As a result of the ad hoc nature of integration of presently searchable science and humanities findings into curricula, the process is slow, not-optimized and unavailable in the majority of products because is the domain of workers who are not charged with the responsibility and no principles have been developed to conduct searches related to certain discipline in an optimized fashion using modern computing hardware.

No machines exist to perform this search function as optimized for the purpose of improving the quality of human learning since search hardware is predicated on entirely different business models. In professional and academic search, hardware is deployed to enable searchers acting as individual agents find information related to certain disciplinary questions (e.g. legal databases used to find case law, or scientific searches used to provide background for new studies).

In an example, modern academic practice teaches away from integration of new information, by its organization of regulation and oversight as a slow, consensus-driven process that does not explicitly include new disciplinary findings in review of curricula. Modern learners are disadvantaged by the lack of machine solutions to this issue, since a machine is the only possible way to find relevant information quickly and accurately enough to include in courses while they are being offered.

In an example, the present method and related system provide a process for using machine learning to identify and output a desired quantity of articles to the Instructional Staff or other entity for the learning process. Further details of the present technique can be found throughout the specification and more particularly below.

Figure 5:
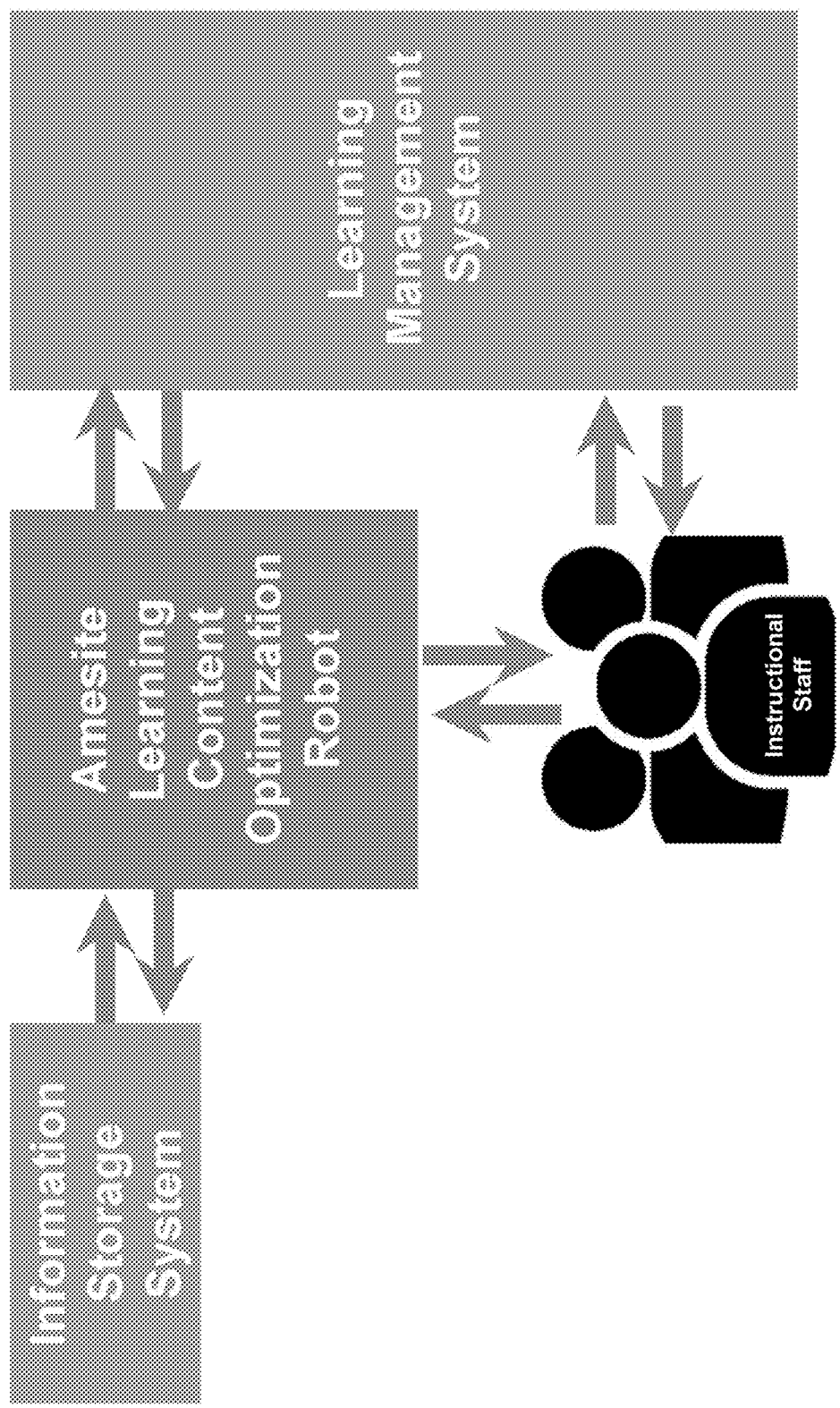

FIG. 5 is a simplified block diagram illustrating a process for learning with the learning content according to an example of the present invention.

Figure 6:
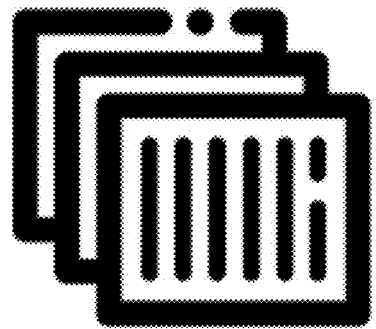

FIG. 6 is a simplified diagram of a machine learning process for a news feed according to an example of the present invention. As shown, each document comprises a set of words. A collection of documents has n unique words. Each document can be represented as an element of an n-dimensional vector space as shown.

FIG. 7 is a simplified diagram of a machine learning process for a news feed according to an example of the present invention. In an example, the method uses Non-Negative Matrix Factorization (NMF) to do feature extraction on a corpus. In an example, NMF works by creating a low-rank approximation of the corpus V resulting in two matrices W and H such that V≈WH. The rank of W is significantly lower than that of D and we can think of its columns as being a basis of D. In an example, each column vector of W is an approximation of the ideal set of words which comprise a document. In an example, the process also hand curates a list of words returned by the NMF and make a new document out of them.

FIG. 8 is a simplified diagram of a machine learning process for a news feed according to an example of the present invention. As shown, tf-idf is a numerical statistic provided that reflects how important a word is to a document amongst a corpus. The numerical statistic is provided over all documents.

Figure 9:
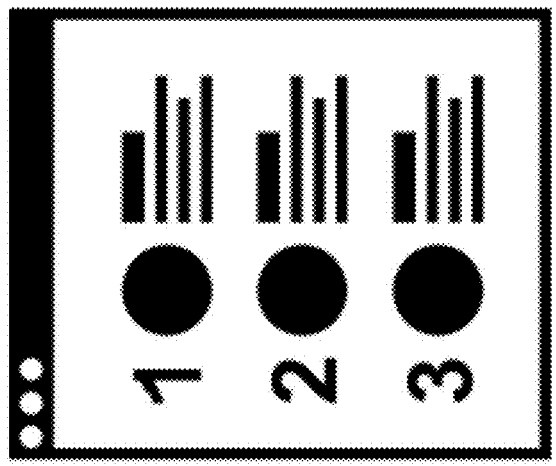

FIG. 9 is a simplified diagram of a machine learning process for a news feed according to an example of the present invention. Using the tf-idf scored vectors for each document, the process calculates the cosine similarity between each document vector and the document composed of the words returned from the NMF feature extraction. Next, the process ranks the documents and are served up the top 10 or other desired number each week to the instructor for sharing.

In an example, the present invention provides a method for using learning content robot coupled to an information storage system to create a program for a learning process within a pre-determined time period. In an example, the method includes within the pre-determined time period of twenty four hours, processing a plurality of documents from an information management system using a learning content robot, the plurality of documents being stored in one or more storage resources of an information storage system. In an example, the storage resources is coupled to a world wide network of computers. The method includes using an artificial intelligence processing engine comprising a natural language processing engine coupled to the information storage system to search the information storage system using a key word or a pattern of key words for a selected topic. In an example, the selected topic is related to the program for the learning process. The method includes parsing information, using a parsing engine, derived from the search and processing the parsed information using a neural network, having a plurality of weighing factors associated with the selected topic for the program; selecting a document from the plurality of documents based upon the process of the parsed information. The method includes transferring the selected document to a learning management system, the learning management system comprising the program related to the selected topic for a course. In an example, the program comprises a plurality of pre-defined templates for the course, and a plurality of non-defined templates for the course. The method includes populating the selected document into the non-defined template using a configuration engine for the course to create a currently defined template using the selected document for the topic; and presenting the program with the selected document to a user of the learning management system within the pre-determined time of twenty four hours.

In an example, the method further comprises a displaying the selected document before configuring the selected document into the non-defined template. The displaying provided on a display coupled to the learning management system. In an example, the selected document is a publication made within twenty four hours of processing the document using the learning content robot to provide for current information for the course. In an example, the learning content robot comprises a graphical processing unit configured with the natural language processing engine. In an example, the method further comprises storing the selected document in a memory cache configured to store a plurality of other selected documents in a temporary storage resource to be viewable in order of relevance from a highest relevance to a lowest relevance in association with the topic. Of course, there can be other variations, modifications, and alternatives.

In an example, various hardware elements of the invention can be implemented using a smart phone with a capture image of a user according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino California. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In embodiments of the present invention, various uses of blockchain coding may provide authentication and verification of the education process. For example, course materials provided directly from an institution (e.g. lecturer, professor) or the modified course materials provided to the user using embodiments of the present invention may be encoded into a first block (not necessarily the ordinal first block) in a block chain. In various embodiments, the authentication may also include proof of accreditation of the course and/or the institution itself. In some embodiments, prior to hashing, the materials may be encoded with a provider private key. It is contemplated that the first block can help verify the materials provide to the user are genuine and authorized.

In some embodiments, education materials provided to the user are customized for each user, for example, by adding the user's name, address, student identifier, or the like to the documents, videos, etc. Accordingly, the blockchain hash of educational materials for different users should also be different. Such techniques are usable in embodiments where course materials are highly valuable, and only students who enroll in the course should be able to receive credit or certification for the course. In such cases, if a third-party attempts use the course materials without registering, the third party cannot receive accreditation for the course. This is because the block corresponding to the course materials in the third party's blockchain will not be authenticated with the third party's name.

Next, in various embodiments, if a user completes a course successfully, an additional block is added to the blockchain. The blockchain hash may be performed upon the student data (e.g. name, student ID, course, time, etc.), one or more certificates of completion, course information (e.g. institution name, professor name, course name, credit hours, etc.), grade, and the like. In various embodiments, the user may be authenticated by other means, such as social security number, private key, password, or the like. In various embodiments, the new block includes a hash of the previous block (e.g. proof that the education materials used were authorized) plus the hash of the above user information. As a result, the blockchain can be used to prove that the authorized user completed a specific course authorized by a specific accredited institution.

In various embodiments of the present invention, as a user repeats the above process for different courses, additional blocks are added to the blockchain. The blockchain thus can verify the user's credits, grades, etc.; can verify that the course was provided by an authorized institution, and can verify that the user was authorized to take the course. In various embodiments, various educational providers, educational institutions, and other distributed stakeholders by store blockchains geared towards educational achievements.

In some embodiments, transactions within the process described above may also include payment information. In various embodiments, payment information may be made using available coin offerings. In other embodiments, payment information may be made using a custom coin offering directed to education on all different levels, education from institutions of higher learning, offerings in conjunction with educational 529 plans, and the like. The inventor is not currently aware of such educationally-directed coin offerings, but believes they may be used in various embodiments of the present invention.

In an example, the invention also includes a method for a secure learning experience using a encrypted encoded network. The method includes configuring a course module information (e.g., user identification, course, pass or non-pass results, and other information) derived from an interactive course platform coupled to a server and a network. In an example, the course module comprises information provided from a human user coupled to a plurality of sensing devices, including at least an image capturing device, a motion sensor, and an ambient sensor. The method includes assigning a time and date stamp on the course module and processing the course module to validate it against a predetermined quality metric, coding format, and ratification information to configure a second course module in a canonical format. The method includes processing the course module in the second format using an encryption process and configuring the course module on a public ledge in a block chain configuration.

Figure 10:
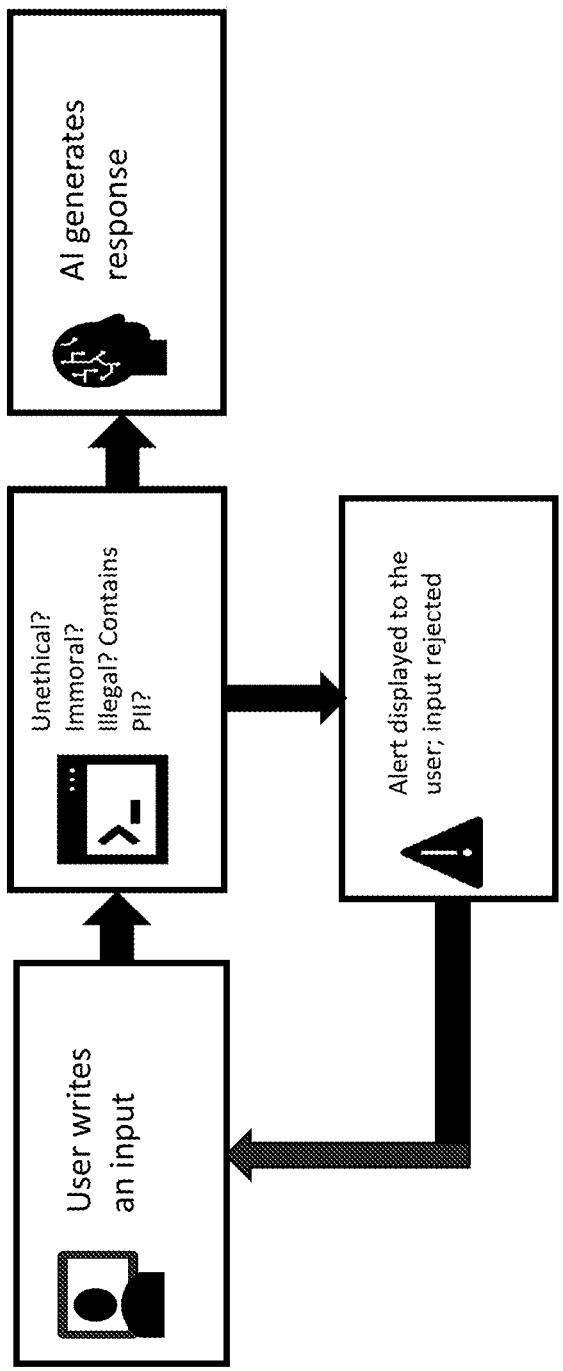
FIGS. 10-12 are simplified diagrams illustrating a method according to an example of the present invention.
Figure 11:
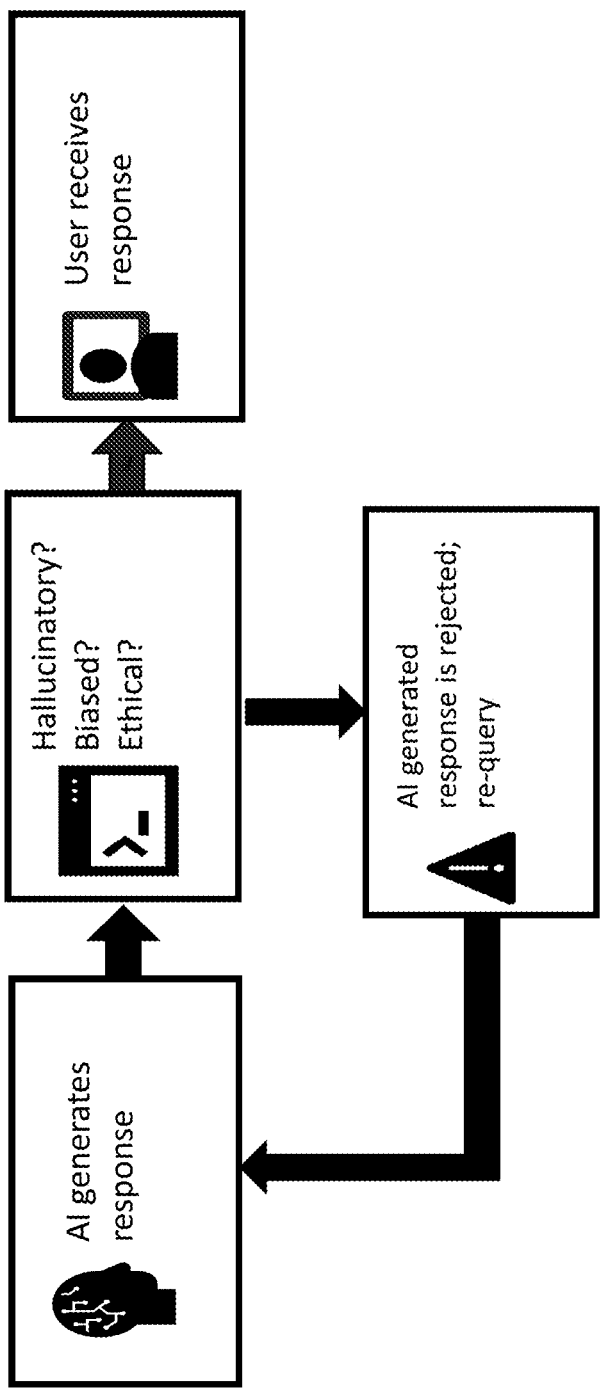
Figure 12:
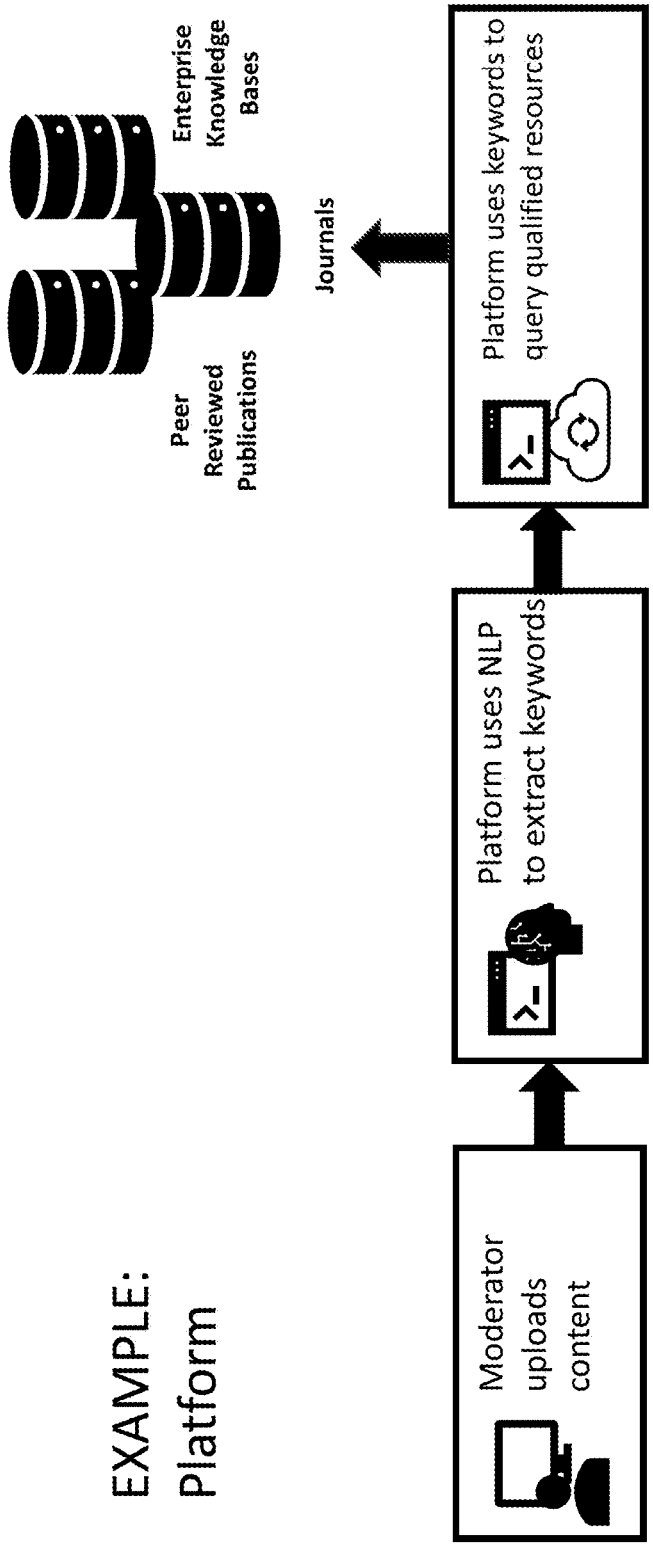

Referring to FIGS. 10 to 12, generative AI implementations comprise use of a wide range of techniques that must interact with large, typically searchable databases of information that are constantly changing. Further, practical applications of generative AI require that large corpuses of information be ingested in the form of queries, responses, conversation and other commentary. Our implementation comprises three overarching controls on data, inputs and outputs.

A challenge with implementation of effective use of large corpuses of data to train AI's is the low quality of data. Peer-reviewed and other qualified data sets comprise a small minority of available information on the internet; content creation by individuals predominates. Though, in theory, qualification of data could occur as a natural result of vetting processes by large numbers of users, the reality is that significant expanses of these data are highly biased and unqualified, and moreover, are themselves created by AIs.

Thus a key step in conditioning data for use in learning experiences is data qualification, whereby data sources are qualified according to a particular standard (e.g. peer review or published and monitored journalistic standards). In a specific example, a database such as Gale would be queried through an API integrated into the Amesite platform, making its prequalified content searchable and deployable for specific applications.

Both informal and regulated standards exist for queries, responses, conversation and other commentary on online platforms. Generative AIs have the potential to dramatically improve enforcement of these standards by assessing input suitability and preventing either inappropriate queries to AIs, or to commentary by users more generally. For example, an inappropriate query on the Amesite platform would be prevented by assessing the query against a regulatory standard as a step prior to synthesis of a response by an AI. In another example, a comment to be posted on the Amesite platform would undergo a test against an informal standard, with a warning to the user if the post was deemed inappropriate, or a suggestion for modification to bring it within the enforced standard.

Generative AIs frequently generate inappropriate or inaccurate information; "hallucinations" (machine learning technology interpretation error) are common. Results from generative AIs can and should be vetted for both appropriateness and accuracy. For example, use of a reference to a published article by a generative AI on the Amesite platform would vetted by checking the response against a licensed database to assure that the reference exists, and that its use to support an argument is appropriate.

In an example, the present techniques include a dynamic learning experience powered by generative (artificial intelligence) AI, delivered with efficiency via generative ai coding techniques. In an example, the generative AI processing engine is a type of artificial intelligence software that is designed to create new, unique data or content that resembles human-created output. It typically uses machine learning algorithms to analyze and learn from existing data and then generates new content based on that analysis. Generative AI engines can be trained on a variety of data types, such as text, images, audio, or video, and can be used for a wide range of applications, from art and design to language processing and game development.

The engine works by first being trained on a large dataset of existing content that is relevant to the task it will perform. This could be, for example, a dataset of images, text, or audio that it will use to generate new content. The AI engine then uses this training data to create a mathematical model that represents the patterns and structures in the data. Once the model has been created, the AI engine can generate new content by using the learned patterns and structures to produce output that is similar to the original dataset. The AI engine can be used to create new content from scratch, or to modify existing content in specific ways. Generative AI processing engines can be further divided into specific types, such as text-generating AI, image-generating AI, or music-generating AI, depending on the type of data they work with. The specific techniques used to generate new content may also vary depending on the type of data being processed. Various terms have been provided as follows:

DSI Dynamic Synthetic Instructor: Instruction
PLI Personalized Learning Information
PLE Personalized Learning Engagement As background, nearly all conventional formal learning experiences are guided by published materials which are utilized either via self-serve or instructor-led formats. Conventional published materials are already outdated by the time they are in learners' hands. Furthermore, published materials are constrained to legacy formats that stemmed from traditional paper publishing, rendering them creatively limited, nonadaptive, and static. In an example, the present generative AI enables experiences with simultaneous delivery of "adaptive, user-driven design, with dynamic integration of new information and engagement, including answering questions in real time.

In an example, various planks comprise the technical plan and design. First, generative AI is used to create various templates that serve content in formats that are either prespecified, user-elected or hybrid. Second, generative AI is used to present curated information from qualified sources, into these digestible, accessible and creative formats. Third, generative AI is used to engage learners in prepared chat and collaboration spaces, enabling them to have questions answered, create or co-create new content, or collaborate or hold discussions with other learners and/or instructors.

In an example, the present techniques use a combination of sourced unsupervised and semi-supervised machine learning algorithms, and purpose-built code to curate content licensed from third-party databases.

Various benefits are achieved. In an example, the term "lecture" is now outdated; instead, every learning experience can and should be customized based upon the learner and materials. The primary learning experience should be online, with in-person engagement layered into experiences. Every element of every learning experience should include generation of results by learners and collaboration by learners. Integration of these tool into our online learning platform would be novel as the first mass-marketed learning solution for both instructors and learners, and also reimagine the learning experience.

In an example, the present technique uses multiple separate engines that are each configured as a plurality of functions or as a single multimodal experience. The latter (single) experience would be the preferred embodiment, because the user (learner) would be able to decide how to engage with the robotic engine, and dynamically configure the purpose and nature of a conversation.

In an example, the vision is to "seed" learning experiences with "seed information (SI)." The SI takes the form of required knowledge (e.g., say, key concepts of material handling safety for a course on managing MSDSs), learning objectives (LOs) that take the form of a listing of facts and/or concepts that the learner demonstrate understanding of (e.g., say, LO: Demonstrate the ability to integrate trigonometric functions), or other, more abstract commands (e.g., say, LO: Demonstrate the ability to navigate conflicts in professional situations). Once complete, the AI robotic engines would work singly or in concert to adapt the experience to learner needs using one or more of the following robots:

Curation robot, that dynamically sources and ingests information that is relevant to the learning experience and offers the learner both new information related to the subject matter and desired mastery level of the learner, and also context for material that is preloaded into the platform to initiate the learning experience and configured using hardware and software;

Display robot, that dynamically integrates "seed" or initial material embedded in the learning experience with new information as appropriate, enabling the learner to consume relevant and useful information in the learning experience and configured using hardware and software;

Assessment robot, that dynamically produces questions to the learner that build curiosity, engagement and knowledge, offering incentives to participate, including but not limited to, grades, prizes, awards, tokens, coins or other desirable asset and configured using hardware and software;

Answering/discussion robot, that dynamically produces response to questions/queries based on a qualified corpus of information ingested by the platform and configured using hardware and software;

Accreditation robot, that dynamically assesses the quality of the learning experience, its professional and societal relevance, and its accreditation according to a set of standards agreed upon by peer or other review and configured using hardware and software.

Content robot, that dynamically produces content, including answering questions, creating posts, code, mathematics, analysis, and other information and configured for content generation using hardware and software.

In an example, the robots have one or more of the following features.

Temporal actions by robots: robots may act either in real time, a prior or some hybrid temporal scheme.

Training: robots train on data provided by both active sourcing of information from any plurality of databases and also from engagements with users of the platform, including students, administrators, peer reviewers, instructors, moderators, etc.

Tone: robots' actions are directed purely to engage users productively in order to incentivize successful completion of useful learning experiences. We note that the word "utility" does not favor teaching poetry or philosophy over software, since it is well-known that education in the liberal arts has high utility in human endeavors. Rather, the tone of the learning experience is designed to demonstrate that utility, rather than establish a "weed-out" or selectivity that creates an accredited cohort of learners vetted only by comparison within the group.

In an example, the present software bot, also known as a bot or a chatbot, is a type of computer program that can automate certain tasks and interact with users through a conversational interface. Bots can be programmed to perform a wide range of tasks, from answering simple questions to performing more complex operations such as data entry, analysis, and processing. They can also be used to provide customer support, lead generation, and other forms of assistance to users. Chatbots can be integrated with popular messaging platforms such as Facebook Messenger, Slack, and WhatsApp. They use natural language processing and machine learning techniques to understand and respond to user inputs, making them more effective in interacting with humans. In the present example, the bot has been integrated with a learning management system, and generative artificial intelligence engine. Software bots can be customized to fit specific business needs and can save time and resources by automating repetitive tasks. They can also improve customer engagement and satisfaction by providing 24/7 assistance and personalized experiences.

In an example, one or more of these concepts is in opposition to the framework of conventional education, which deliberately down selects material deemed suitable for instruction using a series of human committees, institutions, and reviewers. Once this information has been vetted, information is entrained into conventional static course packs, text books or other formats that are used to deliver experiences that are identical by design. These experiences vary only in the way that users respond to them, and they do not change based on user response, but rather only to the particular infrastructural designers' decisions. Under the present techniques, the learning experience itself is adaptive to user input, rather than periodic review by a framework of existing authorities.

In yet an alternative example, the present techniques provide a dynamic learning experience curated by Generative AI. These learning experiences are created using Generative AI models and by ingesting canonical source materials. AI tools are used to develop topic-based questions and template lecture experiences in HTML, CSS, and JavaScript. One or more tools used include Visual Studio Code (Code Editor), ChatGPT by OpenAI, GitHub Copilot by GitHub, and Coding Languages—HTML, CSS, JavaScript, among others.

In an example, the present techniques provides a user interface including various parts, including a "main screen" display presents the lecture material for the lesson, a "question screen" presents a question(s) related to the current "main screen" content to be answered by the learner, and a "chatbot screen" presents a chatbot for questions to be asked by the learner.

In an example, an artificial intelligence (AI) model utilizing OpenAI's GPT-3 ingested canonical materials and a specific format of data and returned prepared materials in the requested format. In an example, formatted data was provided to a template of HTML, CSS, and JavaScript where it is ingested and presented dynamically. In an example, lecture material including one or more "slides" of information that can be navigated using the provided navigation buttons. In an example, each "slide" of material was paired with at least one multiple choice question to display in the "question screen." The answer can be checked by the learner with the provided submit button. If the learner's answer is incorrect, they receive an alert notifying them of the correct answer. If the learner's answer is correct, they receive an alert notifying them that they got it correct. Confetti displays on the "main screen" with a correct answer. In an example, a "chatbot screen" accepts any learner questions and generates a static response.

A series of methods are provided below in reference to the FIGS. 13-16.

Template Creation

Engineer→Provide functionality and design instructions for each step of the desired outcome as prompts to ChatGPT, which is a generative AI engine developed by.

ChatGPT→Provide code output based on prompts. Code output is in the form of code snippets and comments.

Engineer→Review each code snippet against Amesite software development life cycle (SDLC) standards and make minor adjustments to correct UI/UX.

ChatGPT→Provide updated code output based on prompts. Code output is in the form of code snippets and comments.

Engineer→Over multiple iterations, collect and provide feedback and code in small increments until the expected result has been achieved.

ChatGPT→Provide code output based on prompts.

Content Creation

Engineer→Provide an Amesite created template for the content format and subject matter as a prompt.

ChatGPT→Returns an output of formatted lesson materials and questions based on the provided template.

As described, ChatGPT is an AI-powered chatbot that uses natural language processing and machine learning algorithms to understand and respond to user inputs. It is part of the GPT (Generative Pre-trained Transformer) family of models, which are known for their ability to generate human-like language and understand the context and nuances of human conversation. ChatGPT can be integrated with various messaging platforms and can be used for a wide range of applications, including customer support, lead generation, and personalized recommendations. It can answer questions, provide information, and engage in free-form conversation with users. Unlike rule-based chatbots, ChatGPT is capable of learning from previous interactions and improving its responses over time. It is also able to generate unique and creative responses, making it more effective in interacting with humans. To use ChatGPT, a user simply types in their question or input and the AI model responds with a natural language response. The responses are generated in real-time and are tailored to the specific context and needs of the user.

In an example, the present invention provides a system for real time knowledge of current events. The system has a network of computers interconnect to another to form a world wide network of computers. The system has a processing unit coupled to the network of computers using a communication bus and an information storage system coupled to the network of computers and the processing unit. The information storage system comprises a plurality of documents. The system has a learning management system coupled to the network of computers. The learning management system comprises a program related to a topic for a course. In an example, the program comprises a plurality of pre-defined templates for the course, and a plurality of non-defined templates for the course.

In an example, the system has an artificial intelligence processing engine coupled to the processing unit and a learning content robot coupled to the information storage system. In an example, the learning content robot is coupled to the artificial intelligence processing engine. The artificial intelligence processing engine comprises a natural language processing engine being coupled to the information storage system. The natural language processing system being configured to construct a plurality of occurrence vector spaces respectively representing the plurality of documents, each occurrence vector space indicating respective numbers of occurrences in the respective document of each of a plurality of words included in a curated list, generate a respective plurality of importance vector spaces for the plurality of documents from the plurality of occurrence vector spaces, determine a similarity for each of the plurality of documents, each similarity being between the importance vector space of the corresponding document and a reference vector space corresponding to a numbers of occurrences in a reference document of each of the plurality of words included in the curated list, select a document based upon the similarity of the document, and transfer the selected document to the learning management system.

The system has a configuration engine provided in the learning management system to populate the non-defined template with the selected document for the course to create a currently defined template using the selected document for the topic and a content robot configured with the artificial intelligence engine to generate content for a user.

In an example, the system further comprising a display coupled to the configuring engine to view the selected document before configuring the selected document into the non-defined template. In an example, the selected document is a publication made within twenty four hours of processing the document using the learning content robot. In an example, the learning content robot comprises a graphical processing unit configured with the natural language processing engine. In an example, the system has a memory cache configured to store a plurality of selected documents in a temporary storage resource to be viewable in an order determined using the respective cosine similarities of the selected documents.

In an example, the invention also has a method for using a learning content robot coupled to an information storage system to create a program for a learning process within a pre-determined time period. The method within the pre-determined time period, performs steps of processing, using the learning content robot, a plurality of documents from an information management system, the plurality of documents being stored in one or more storage resources of an information storage system, the storage resources being coupled to a world wide network of computers. The method includes constructing a plurality of occurrence vector spaces respectively representing the plurality of documents, each occurrence vector space indicating respective numbers of occurrences in the respective document of each of a plurality of words included in a curated list. The method includes generating a respective plurality of importance vector spaces for the plurality of documents from the plurality of occurrence vector spaces. The method includes determining a respective similarity for each of the plurality of documents, each similarity being between the importance vector space of the corresponding document and a reference vector space corresponding to a numbers of occurrences in a reference document of each of the plurality of words included in the curated list. The method includes selecting a document from the plurality of documents based upon the similarity of the document. The method includes transferring the selected document to a learning management system, the learning management system comprising the program related to the selected topic for a course, the program comprising a plurality of pre-defined templates for the course, and a plurality of non-defined templates for the course. The method includes populating the selected document into the non-defined template using a configuration engine for the course to create a currently defined template using the selected document for the topic and presenting the program with the selected document to a user of the learning management system.

In an example, the method includes displaying, on a display coupled to the learning management system, the selected document before configuring the selected document into the non-defined template. In an example, the selected document is a publication made within twenty four hours of processing the document using the learning content robot. In an example, the learning content robot comprises a graphical processing unit configured with the natural language processing engine. In an example, the method includes storing the selected document in a memory cache configured to store a plurality of other selected documents in a temporary storage resource to be viewable in an order determined using the respective cosine similarities of the selected documents. In an example, the predetermined amount of time is 24 hours to perform the steps. In an example, the method includes storing the program in a storage archive, the storage archive having a plurality of archived programs.

In an example, the invention provides a method for using a learning content robot coupled to an information storage system to create a program for a learning process within a pre-determined time period. In an example, the method includes processing, using the learning content robot, a plurality of documents from an information management system, the plurality of documents being stored in one or more storage resources of an information storage system, the storage resources being coupled to a world wide network of computers; constructing a plurality of occurrence vector spaces respectively representing the plurality of documents, each occurrence vector space indicating respective numbers of occurrences in the respective document of each of a plurality of words included in a curated list, generating a respective plurality of importance vector spaces for the plurality of documents from the plurality of occurrence vector spaces, each importance vector space including term frequency-inverse document frequency (tf-idf) values respectively corresponding to the numbers of occurrences in the respective occurrence vector spaces, determining a respective cosine similarity for each of the plurality of documents, each cosine similarity being between the importance vector space of the corresponding document and a reference vector space corresponding to a numbers of occurrences in a reference document of each of the plurality of words included in the curated list; selecting a document from the plurality of documents based upon the cosine similarity of the document; and transferring the selected document to a learning management system, the learning management system comprising the program related to the selected topic for a course, the program comprising a plurality of pre-defined templates for the course, and a plurality of non-defined templates for the course. The method includes populating the selected document into the non-defined template using a configuration engine for the course to create a currently defined template using the selected document for the topic and presenting the program with the selected document to a user of the learning management system within the pre-determined time of twenty four hours.

In an example, the method includes displaying the selected document on a display coupled to the learning management system before configuring the selected document into the non-defined template. The selected document is a publication made within twenty four hours of processing the document using the learning content robot. In an example, the learning content robot comprises a graphical processing unit configured with the natural language processing engine.

In an example, the invention provides a system for real time knowledge of current events. The system has a network of computers interconnect to another to form a world wide network of computers. The system has a processing unit coupled to the network of computers using a communication bus and an information storage system coupled to the network of computers and the processing unit, the information storage system comprising a plurality of documents. The system has a learning management system coupled to the network of computers. the learning management system comprises a program related to a topic for a course, the program comprising a plurality of pre-defined templates for the course, and a plurality of non-defined templates for the course.

In an example, the system has an artificial intelligence processing engine coupled to the processing unit and a plurality of robots coupled to the artificial intelligence processing engine to create a generative artificial intelligence processing engine to teach a learner. In an example, the robots include a learning content robot coupled to the information storage system. The learning content robot IS coupled to the artificial intelligence processing engine. The artificial intelligence processing engine comprises a natural language processing engine being coupled to the information storage system.

In an example, the system has a curation robot coupled to the artificial intelligence processing engine to process information from the information storage system and configured to output current information and conventional information to a learner and an assessment robot coupled to the artificial intelligence processing engine configured to output questions to a learner based upon a document from the information storage system. The system has an answering robot coupled to the artificial intelligence processing engine configured to provide a response from a learner input into the learning management system and an accreditation robot coupled to the artificial intelligence processing engine configured to determining a quality of a learning experience based upon an interaction between the learning content robot, curation robot, assessment robot, and answering robot with the learner.

In an example, the accreditation robot can issue a certificate for completing a topic or course. The certificate can be configured on a block chain among a plurality of servers for security. In an example, the certificate can be issued as an NFT.

In an example, the NFT (non-fungible token) is a unique digital asset that is stored on a blockchain, which is a distributed ledger that records transactions. These tokens can represent a variety of things, such as artwork, collectibles, and even certificates. In the context of a learning certificate, an NFT can be used to represent a digital credential that certifies the completion of a specific course or program. The NFT would be unique and specific to the individual who earned the certificate, and would be stored on the blockchain as a secure and tamper-proof record of their achievement. Using an NFT for a learning certificate provides a number of benefits. For example, it can provide a more secure and verifiable way to store and share digital credentials. It can also provide a way to verify the authenticity of the certificate and ensure that it has not been tampered with. Furthermore, an NFT can provide a more personalized and unique experience for the learner. The NFT can be designed to be visually appealing and unique to the specific program or course, making it a more meaningful and memorable way to represent their achievement. Overall, using an NFT for a learning certificate can provide a more secure, verifiable, and personalized way to represent and share digital credentials.

In an example, the system has a content robot configured with the artificial intelligence engine to generate content for the user. In an example, the artificial intelligence processing engine comprises a generative artificial processing engine configured for generating the output questions for the learner and generating the response for the leaner. In an example, the generative artificial processing engine comprises CHAT GPT using an interface.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation.

Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. In an example, the various robots or bots can be separate independent bots, or be combined, or even separated or a single bot. Additionally, the bots can be coupled to a single or multiple artificial intelligence engines. It will, however, be evident that various modifications and changes may be made thereunto without departing from the broader spirit and scope of the invention as set forth in the claims.

The invention claimed is:

1. A system for real time knowledge of current events, the system comprising:
 a network of computers interconnect to another to form a world wide network of computers;
 a processing unit coupled to the network of computers using a communication bus;
 an information storage system coupled to the network of computers and the processing unit, the information storage system comprising a plurality of documents;
 a learning management system coupled to the network of computers, the learning management system comprising a program related to a topic for a course, the program comprising a plurality of pre-defined templates for the course, and a plurality of non-defined templates for the course;
 an artificial intelligence processing engine coupled to the processing unit;
 a learning content robot coupled to the information storage system, the learning content robot coupled to the artificial intelligence processing engine, the artificial intelligence processing engine comprising a natural language processing engine being coupled to the information storage system, the natural language processing system being configured to:
 construct a plurality of occurrence vector spaces respectively representing the plurality of documents, each occurrence vector space indicating respective numbers of occurrences in the respective document of each of a plurality of words included in a curated list,
 generate a respective plurality of importance vector spaces for the plurality of documents from the plurality of occurrence vector spaces,
 determine a similarity for each of the plurality of documents, each similarity being between the importance vector space of the corresponding document and a reference vector space corresponding to a numbers of occurrences in a reference document of each of the plurality of words included in the curated list,
 select a document based upon the similarity of the document, and
 transfer the selected document to the learning management system; and
 a configuration engine provided in the learning management system to populate the non-defined template with the selected document for the course to create a currently defined template using the selected document for the topic; and
 a content robot configured with the artificial intelligence engine to generate content for a user.

2. The system of claim 1 further comprising a display coupled to the configuring engine to view the selected document before configuring the selected document into the non-defined template.

3. The system of claim 1 wherein the selected document is a publication made within twenty four hours of processing the document using the learning content robot.

4. The system of claim 1 wherein the learning content robot comprises a graphical processing unit configured with the natural language processing engine.

5. The system of claim 1 further comprising a memory cache configured to store a plurality of selected documents in a temporary storage resource to be viewable in an order determined using the respective cosine similarities of the selected documents.

6. A method for using a learning content robot coupled to an information storage system to create a program for a learning process within a pre-determined time period, the method comprising:
 within the pre-determined time period,
 processing, using the learning content robot, a plurality of documents from an information management system, the plurality of documents being stored in one or more storage resources of an information storage system, the storage resources being coupled to a world wide network of computers;
 constructing a plurality of occurrence vector spaces respectively representing the plurality of documents, each occurrence vector space indicating respective numbers of occurrences in the respective document of each of a plurality of words included in a curated list,
 generating a respective plurality of importance vector spaces for the plurality of documents from the plurality of occurrence vector spaces,
 determining a respective similarity for each of the plurality of documents, each similarity being between the importance vector space of the corresponding document and a reference vector space corresponding to a numbers of occurrences in a reference document of each of the plurality of words included in the curated list;
 selecting a document from the plurality of documents based upon the similarity of the document;
 transferring the selected document to a learning management system, the learning management system comprising the program related to the selected topic for a course, the program comprising a plurality of pre-defined templates for the course, and a plurality of non-defined templates for the course;

populating the selected document into the non-defined template using a configuration engine for the course to create a currently defined template using the selected document for the topic; and presenting the program with the selected document to a user of the learning management system.

7. The method of claim 6, further comprising displaying, on a display coupled to the learning management system, the selected document before configuring the selected document into the non-defined template.

8. The method of claim 6 wherein the selected document is a publication made within twenty four hours of processing the document using the learning content robot.

9. The method of claim 6 wherein the learning content robot comprises a graphical processing unit configured with the natural language processing engine.

10. The method of claim 6 further comprising storing the selected document in a memory cache configured to store a plurality of other selected documents in a temporary storage resource to be viewable in an order determined using the respective cosine similarities of the selected documents.

11. The method of claim 6 wherein the predetermined amount of time is 24 hours to perform the steps recited in claim 6.

12. The method of claim 6 further comprising storing the program in a storage archive, the storage archive having a plurality of archived programs.

13. A method for using a learning content robot coupled to an information storage system to create a program for a learning process within a pre-determined time period, the method comprising:

processing, using the learning content robot, a plurality of documents from an information management system, the plurality of documents being stored in one or more storage resources of an information storage system, the storage resources being coupled to a world wide network of computers;

constructing a plurality of occurrence vector spaces respectively representing the plurality of documents, each occurrence vector space indicating respective numbers of occurrences in the respective document of each of a plurality of words included in a curated list, generating a respective plurality of importance vector spaces for the plurality of documents from the plurality of occurrence vector spaces, each importance vector space including term frequency-inverse document frequency values respectively corresponding to the numbers of occurrences in the respective occurrence vector spaces, determining a respective cosine similarity for each of the plurality of documents, each cosine similarity being between the importance vector space of the corresponding document and a reference vector space corresponding to a numbers of occurrences in a reference document of each of the plurality of words included in the curated list;

selecting a document from the plurality of documents based upon the cosine similarity of the document;

transferring the selected document to a learning management system, the learning management system comprising the program related to the selected topic for a course, the program comprising a plurality of pre-defined templates for the course, and a plurality of non-defined templates for the course;

populating the selected document into the non-defined template using a configuration engine for the course to create a currently defined template using the selected document for the topic; and presenting the program with the selected document to a user of the learning management system within the pre-determined time.

14. The method of claim 13 further comprising displaying the selected document on a display coupled to the learning management system before configuring the selected document into the non-defined template.

15. The method of claim 13 wherein the selected document is a publication made within twenty four hours of processing the document using the learning content robot.

16. The method of claim 13 wherein the learning content robot comprises a graphical processing unit configured with the natural language processing engine.

* * * * *